United States Patent [19]

Yates

[11] 4,238,834

[45] Dec. 9, 1980

[54] APPARATUS FOR COORDINATING REAL TIME TRANSFER OF DATA FROM A PROCESSOR TO A MAGNETIC MEDIA DEVICE

[75] Inventor: Leonard S. Yates, Austin, Tex.

[73] Assignee: International Business Machines Corporation, Armonk, N.Y.

[21] Appl. No.: 884,087

[22] Filed: Mar. 6, 1978

[51] Int. Cl.² .................. G06F 5/06; G06F 5/04; G06F 13/00
[52] U.S. Cl. .................................................. 364/900
[58] Field of Search ... 364/200 MS File, 900 MS File; 365/219

[56] References Cited

U.S. PATENT DOCUMENTS

| | | | |
|---|---|---|---|
| 3,312,948 | 4/1967 | Capozzi | 364/900 |
| 3,587,044 | 6/1971 | Jenkins | 364/200 |
| 3,736,568 | 5/1973 | Snook | 364/900 |
| 3,774,156 | 11/1973 | Marsalka | 364/900 |
| 3,806,886 | 4/1974 | McClellan | 364/900 |
| 3,911,409 | 10/1975 | Kowal | 364/200 |
| 3,997,878 | 12/1976 | Hirvela | 364/900 |
| 4,023,144 | 5/1977 | Koenig | 364/900 |
| 4,028,669 | 6/1977 | Higashide | 364/900 |

*Primary Examiner*—James D. Thomas
*Attorney, Agent, or Firm*—Andrea P. Bryant

[57] ABSTRACT

There is disclosed an improved interface apparatus and technique for real time transfer of characters from a text processor to a magnetic card recorder. Characters retrieved from a buffer are subject to reformatting and other operations, the duration of which varies within two character output cycles. The disclosed technique permits time, in effect, to be borrowed from succeeding character cycles. A character is processed and loaded temporarily in a register. The parallel character is then transferred to a serializer register which outputs serial bits to a card writer control for recording on a magnetic card. At the same time this transfer, serialization, and output is occurring the processor is preparing the next character to be written. A character can be output in real time so long as the interval between it and the preceding character is less than two character output cycles in length.

5 Claims, 6 Drawing Figures

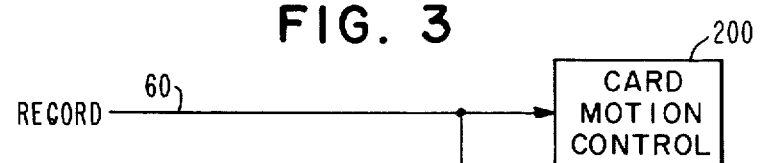
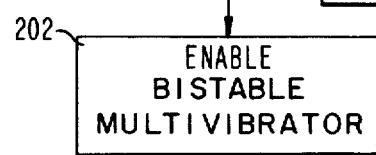
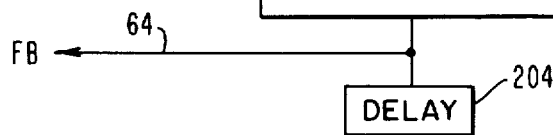
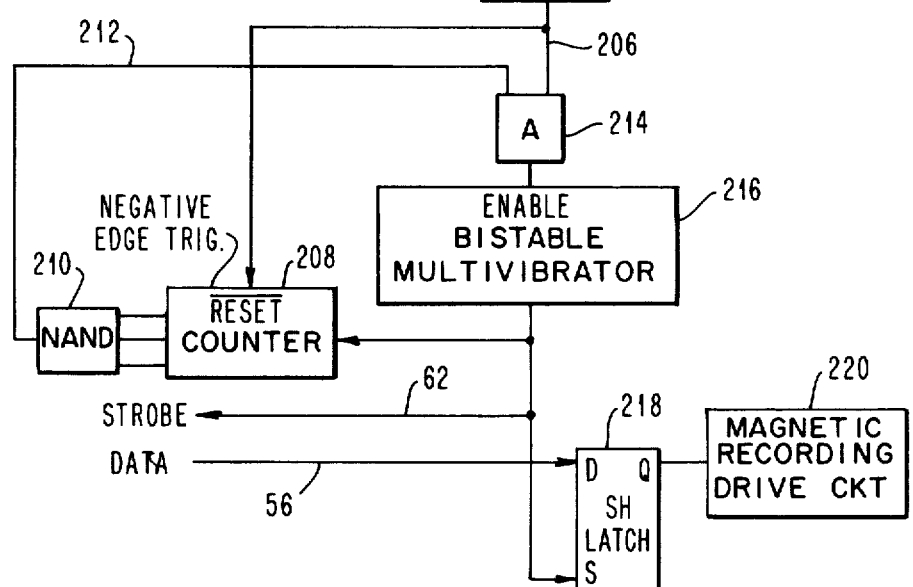
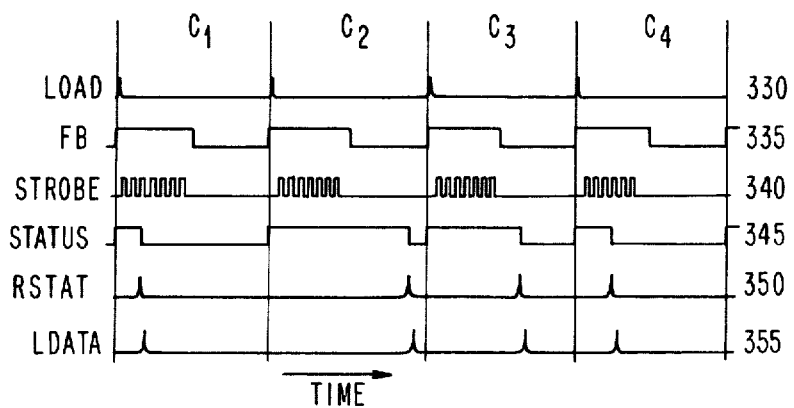

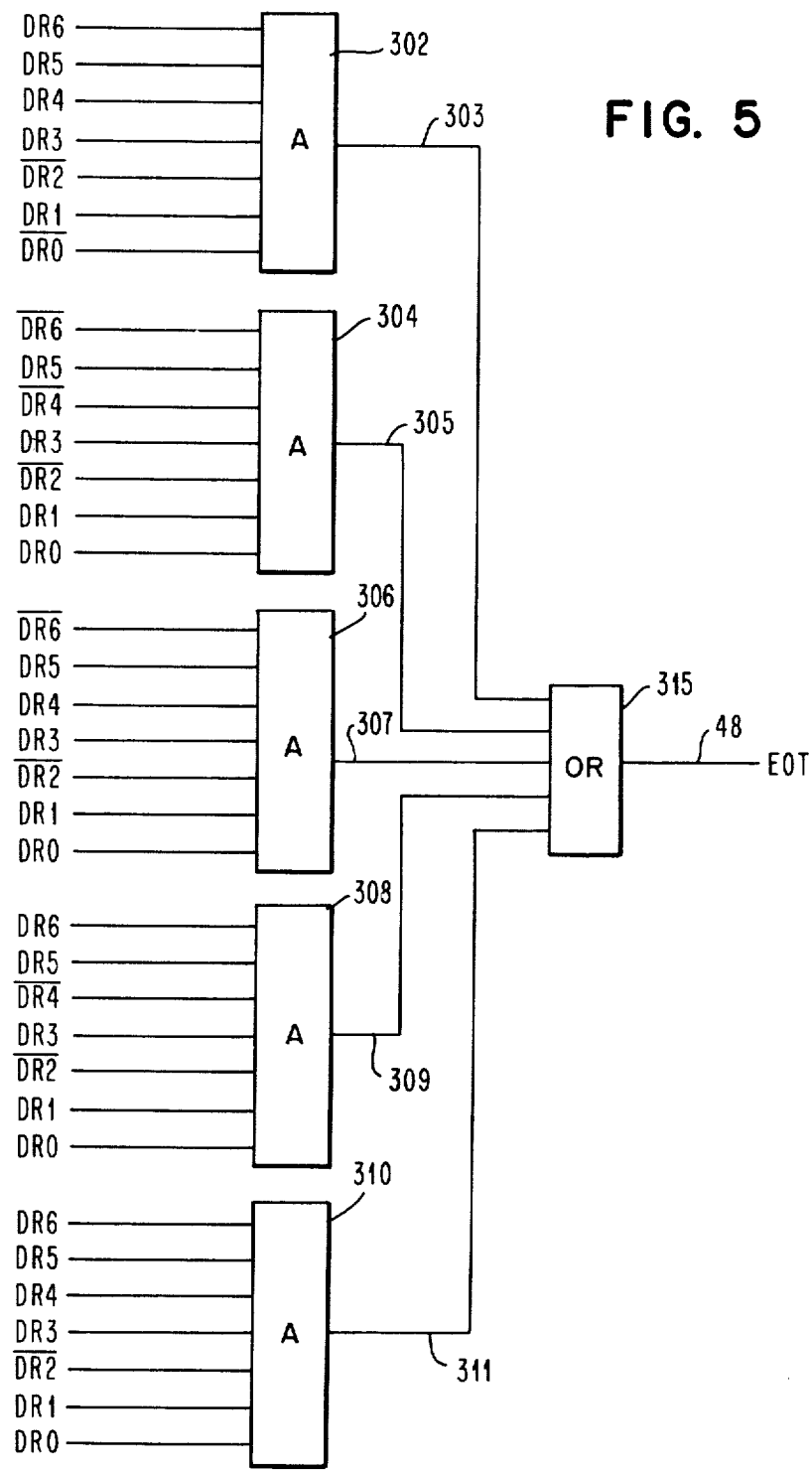

APPARATUS FOR COORDINATING REAL TIME TRANSFER OF DATA FROM A PROCESSOR TO A MAGNETIC MEDIA DEVICE

DESCRIPTION

BACKGROUND OF THE INVENTION

1. Field of the Invention

This invention relates to the transfer of data in one format from a processor to a peripheral device in another format. More specifically it relates to interface apparatus in a text processing system which receives characters seriatim as parallel data at a time varying rate and outputs serial data at a constant rate for output on magnetic media.

2. Description of the Prior Art

Data is recorded on magnetic cards in tracks. Each track is written with no interruptions, that is, the data must be ready at a fixed, constant rate for transfer to the card. In a text processing system including a magnetic card output capability, data to be written on the card is not available at a fixed rate due to the number and lengths of operations which may be performed before a character is ready for output.

It is known in the prior art to avoid time lags between preparation and output by preprocessing at least the number of characters in one track before initiating output. It is known also to use alternating temporary storage buffers for this purpose, that is, while previously processed data is output from one buffer, the other is being loaded.

The chief disadvantage in such a technique is the increased time, complexity and expense involved.

OBJECTS OF THE INVENTION

It is a primary object of the invention to transfer character data from a processor to an output device in real time at a constant rate in an improved manner.

It is an object of the present invention to avoid the requirement of accumulating preprocessed data for an entire track before transfer begins.

It is an object of the present invention to allow the text processor to use, when needed, more time than one character cycle to ready a character for transfer.

SUMMARY OF THE INVENTION

These and other objects are accomplished in accordance with the present invention by providing a means for receiving parallel data from a processor at a variable rate, while transferring serial data at a fixed rate to a magnetic card recorder. Stated differently, character processing, transfer and recording occur in a single operation, rather than first accumulating preprocessed data and then recording.

In the text processing system in which the interface apparatus of the present invention operates, data to be recorded on one track is retrieved from the system memory and stored in a buffer. Once a record mode is entered, each character is fetched from the buffer for processing, the duration of which varies. A register is provided for receiving a character in parallel format. A serializer register receives the parallel character and outputs serial data for recording on the magnetic card at a fixed rate. The interface apparatus of the present invention further includes means for controlling the transfer operation.

It is to be noted that the principal advantage of the invention is what is herein referred to as "borrowing" time from succeeding character cycles. Characters are ready for transfer at a varying time rate, but transfer must occur at a fixed rate. The time between presentation of two characters by the processor to the interface apparatus may be longer than one character output cycle time. On the other hand, the time between two characters may be very near character output cycle time. The present invention permits the processor to use, when needed, more time than one character cycle to ready a character for transfer. Subsequent characters may be ready at a faster rate so that the "borrowed" time is repaid.

The speed at which the relative movement of the magnetic card and recording head can be set is dictated by mechanical and electrical requirements and is relatively fixed. Likewise, there are limits on the clock rate for the electronic system, especially on how fast it can be run. A principal advantage of the invention is that, as a result of the "borrowing" capability, the electronic system clock may be set one half as fast as it would otherwise have to be set in order for the text processor to make characters ready for transfer rapidly enough. This is assuming that it can be guaranteed that the sequence of characters from the text buffer is such that "borrowing" need not be done for several characters in succession that would result in exceeding the "credit limit" of two character cycles. In the text processing system in which the interface apparatus of the present invention operates, this guarantee can be made and, as a matter of fact, it is imperative that the electronic system clock not have to operate any faster than it does because the electronic circuits can not respond reliably in that case.

The foregoing and other features and advantages of the invention will be apparent from the following more particular description of a preferred embodiment of the invention, as illustrated in the accompanying drawing.

BRIEF DESCRIPTION OF THE DRAWING

FIG. 3 is a more detailed diagram of the card write control shown in FIG. 1.

FIG. 5 shows in detail the character decoder shown in FIG. 1.

FIG. 6 is a timing chart useful in showing the operation of the invention.

DESCRIPTION OF A PREFERRED EMBODIMENT

Figure 1:
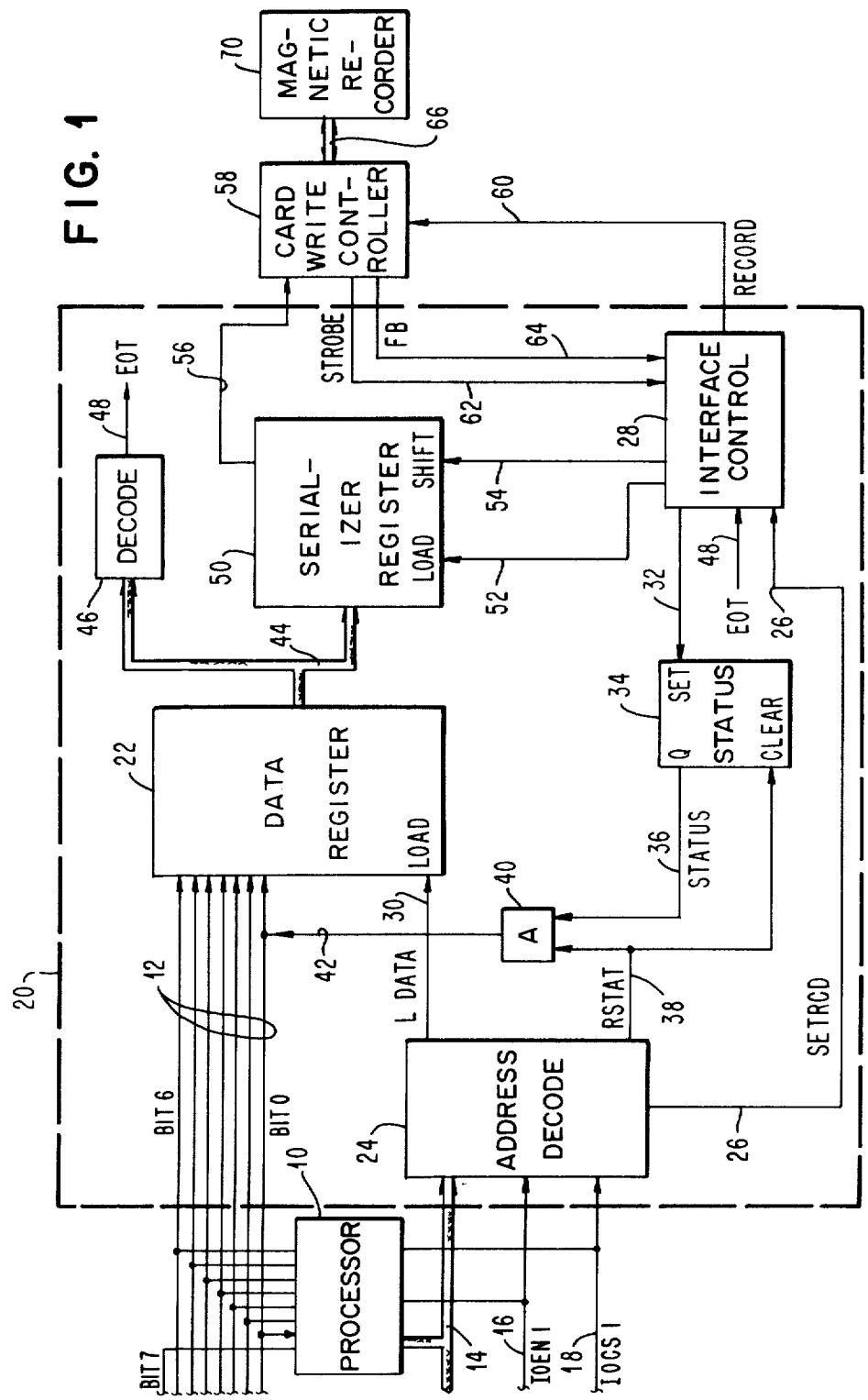
FIG. 1 is a block diagram of the preferred embodiment of the interface apparatus for real time character recording.

Reference is now made in FIG. 1, which is a logic diagram of a preferred embodiment of the invention. Overall data flow is from the processor 10 to the interface apparatus 20 of the invention to card write control 58 for recording via magnetic card recorder 70. Processor 10 is connected to interface 20 by seven bit data bus 12, four bit address bus 14, I/O enable line 16 and I/O chip select line 18. Data bus 12 is connected to data register 22. Address bus 14 and lines 16 and 18 are input to address decoder 24, which is shown in more detail in FIG. 2. Address decoder 24 outputs commands as determined by the particular bit configuration on bus 14 and which of lines 16 and 18 is up. The set record command SETRCD on line 26 is output from address decoder 24 and is one input to interface control 28. Interface control 28 will be described in more detail hereinafter with reference to FIG. 2. Address decoder 24 is connected to data register 22 by line 30 for enabling data register to receive a parallel character from data bus 12. Interface control 28 is connected by line 32 to status latch 34. Line 36 from status latch 34 and the read status command RSTAT on line 38 from processor 10 via address decoder 24 are input to AND gate 40. AND gate 40 is connected to data bus 12, bit zero, by line 42. Output from AND gate 40 thus indicates to processor 10 that data register 22 is ready to receive another character from the processor.

Figure 4:
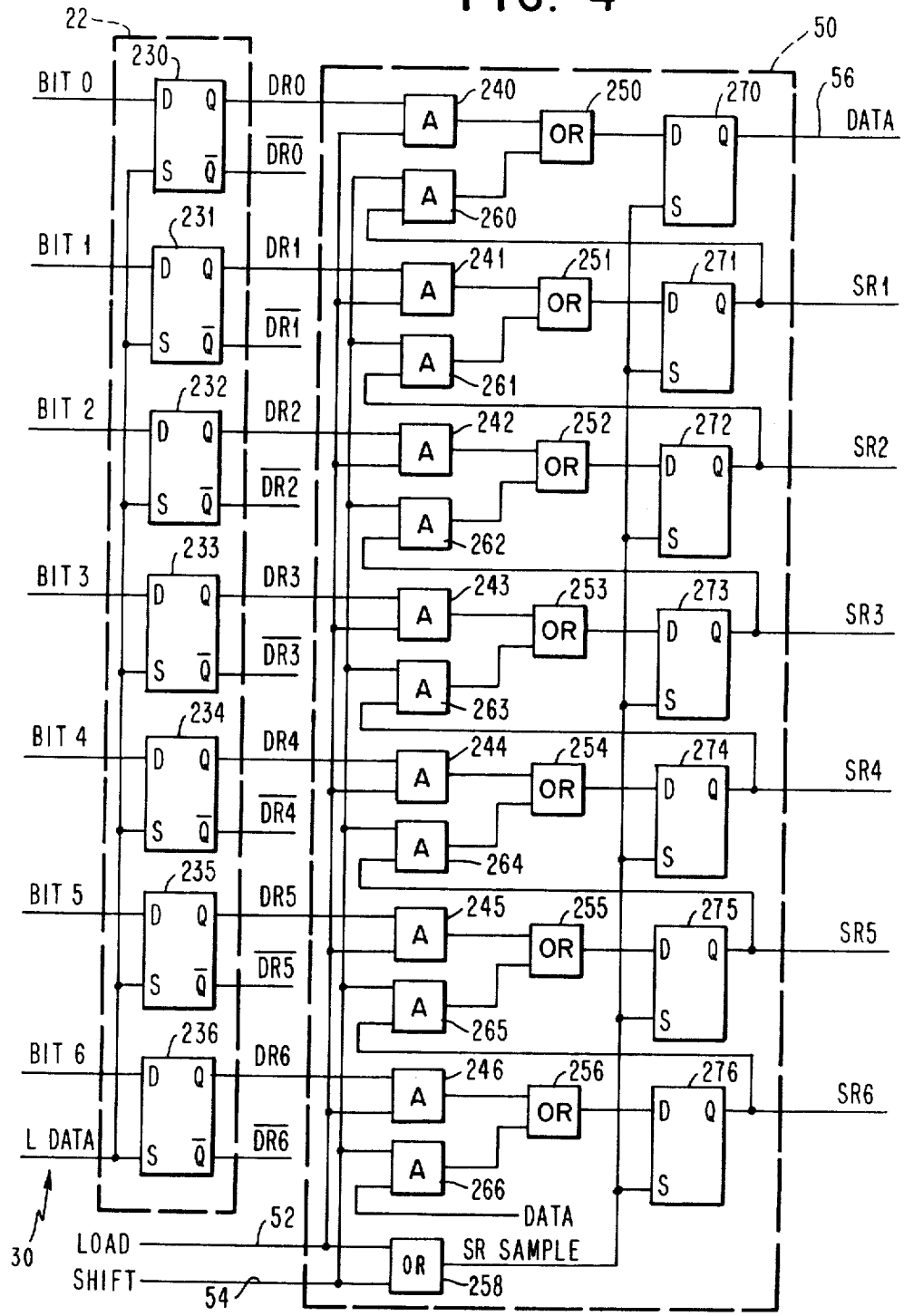
FIG. 4 is a more detailed diagram of the data register and serializer register shown in FIG. 1.

Data register 22 is connected by lines 44 to decoder 46 which determines whether a given character indicates an end of track condition. Decoder 46, described in more detail below with reference to FIG. 5, is connected by line 48 to interface control 28. Data register 22 is also connected by bus 44 to serializer register 50 which is a parallel to serial converter. Details of data register 22 and serializer register 50 are shown in FIG. 4. Serializer register 50 is connected to interface control 28 by lines 52 and 54. Serializer register 50 is connected by serial data line 56 to card write control 58. Card write control 58, which will be described more fully with reference hereinafter to FIG. 3, is connected to interface control 28 by lines 60, 62 and 64. Bus 66 connects card write control 58 to magnetic card writer 70.

Figure 2:
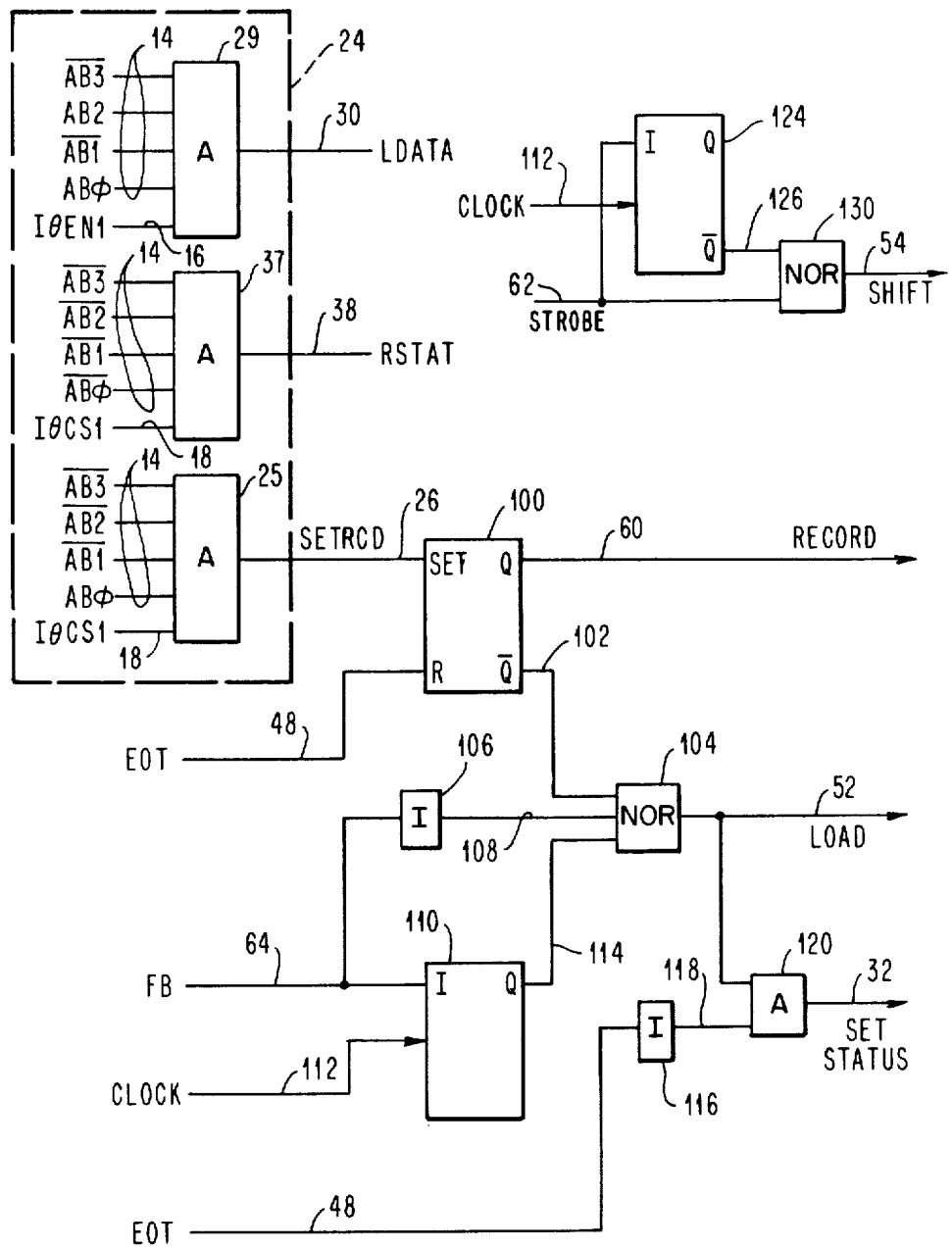
FIG. 2 is a logic diagram of the address decoder and interface control shown in FIG. 1.

FIG. 2 shows in detail the circuitry comprising address decoder 24 and interface control 28 of FIG. 1 for developing signals used to control data transfer from data bus 12 to card write control 58. Address decoder 24 receives a four bit address along with a command signal from either line 16 or line 18. Address decoder 24 functions to determine the address on bus 14 and depending on whether there is a signal on line 16 or line 18, outputs command signals. Gate 29 outputs the LDATA signal on line 30 for controlling transfer of the parallel data on data bus 12 to data register 22. Gate 37 outputs on line 38 the RSTAT command for reading status latch 34. Gate 25 outputs on line 26 the SETRCD command to start a record operation. Line 26 is applied to set record latch 100. It will, of course, be appreciated by those skilled in the art that the bit configurations shown on address bus 14 are for illustrative purposes.

End of track signal EOT from decoder 46 on line 48 is applied to reset latch 100. One output of latch 100 is the RECORD signal on line 60, which is applied to card write control 58. The Q complement signal of latch 100 on line 102 is input to NOR gate 104. The feedback signal FB developed by card write controller 58 on line 64 is negated by inverter 106 and input via line 108 to NOR gate 104. Line 64 is also input to shift register 110 which also receives the system clock signal on line 112. Delayed feedback output on line 114 is applied to NOR gate 104. The output from gate 104 on line 52 is a pulse that occurs each time FB on line 64 rises, and is the LOAD signal applied to serializer register 50 for causing a seven bit parallel word in data register 22 to be transferred via line 44 to serializer register 50. The signal on line 52 output from NOR gate 104 is applied to AND gate 120. End of track signal EOT on line 48 from decoder 46 is inverted by inverter 116 to produce a signal on line 118 which is input to AND gate 120. The output from AND gate 120 on line 32 is applied to set status latch 34. The STROBE signal on line 62 output from the card write control 58, and system clock pulses on line 112 are input to shift register 124. The $\overline{Q}$ signal on line 126 from shift register 124 and STROBE signal on line 62 are input to NOR gate 130. The output of NOR gate 130 on line 54 is a pulse that occurs each time STROBE on line 62 makes a downward transition, and is the SHIFT signal applied to serializer register 50 for shifting character bits out onto data line 56.

FIG. 3 shows the circuitry in card write controller 58 in FIG. 1. The RECORD signal generated by interface control 28 on line 60 is input to card motion controller 200 for starting the relative movement of the magnetic card and recording head. The signal on line 60 is also applied to enable bistable multivibrator 202. Bistable multivibrator 202 has a 50% duty cycle; its output is the FB signal on line 64. The output of bistable multivibrator 202 is also input to delay means 204, which outputs a signal delayed by 0.16 milliseconds on line 206. The delayed signal is used to reset (active low) three-bit binary counter 208. Counter 208 output is applied to NAND gate 210. The output of NAND gate 210 on line 212 is down when the counter has reached seven, and is input to AND gate 214. The other input to AND gate 214 is the delayed signal on line 206. The output of AND gate 214 enables bistable multivibrator 216. Bistable multivibrator 216 has a 25% duty cycle, and a repetition rate of 22 times that of multivibrator 202, and its output is the STROBE signal on line 62, which is used to increment counter 208 on each downward transition of the STROBE signal. The net result, then, of delay unit 204, AND gate 214, multivibrator 216, counter 208 and NAND gate 210 is to produce a quick series of seven pulses on the STROBE signal on line 62 each time FB signal on line 64 comes up, as is illustrated by a timing diagram in FIG. 6. Serial data on line 56 from serializer register 50 is the data input of latch 218. Latch 218 samples input 56 when STROBE signal on line 62 is up. The Q output of latch 218 is input to magnetic card recording head driver circuit 220.

FIG. 4 shows in more detail the transfer of data on bus 12 to data register 22 and from data register 22 to serializer register 50. FIG. 4 shows in detail the parallel to serial conversion of seven bit characters on data bus 12 to serial bits on data line 56. Data register 22 comprises seven latches 230 through 236. Bits 0 through 6 on data bus 12 are applied to the data inputs of latches 230 through 236 respectively. The LDATA command signal on line 30 is applied to the sample input on each of the latches 230 through 236. The Q outputs of latches 230 through 236, in parallel, correspond to data bus 44, shown in FIG. 1. The LOAD signal on line 52 is gated with each of bits 0 through 6 via gates 240 through 246 and OR gates 250 through 256 into latches 270 through 276 respectively. LOAD signal on line 52 and SHIFT signal on line 54 are gated through OR gate 258 into the sample input of latches 270 through 276 respectively. Gates 260 through 266 are provided to receive the SHIFT signal on line 54 and Q outputs of latches 270 through 276 as is well understood by those skilled in the art.

FIG. 5 shows in more detail decoder 46 shown in FIG. 1. In an exemplary embodiment of the invention, 5 seven bit character configurations indicate an end of track EOT condition, that is, to cease recording on a particular track of a magnetic card. Five AND gates, 302, 304, 306, 308 and 310 are provided to interpret characters appearing on bus 44 from data register 22. The outputs of AND gates 302, 304, 306, 308, 310 on lines 303, 305, 307, 309, 311 are input to OR gate 315. The output of OR gate 315 on line 48, is the EOT signal applied to interface control 58 for the purposes described with reference to FIG. 2.

OPERATION OF THE INVENTION

The operation of the interface apparatus 20 which provides for real time transfer of parallel data arriving at the interface at irregular intervals to serial data at a constant rate to the magnetic card recorder 70 will be described with reference to the timing chart shown in FIG. 6 and FIG. 1. For illustrative purposes, only four character cycles, C1, C2, C3 and C4 are shown during recording on a given track. At the beginning of the timing diagram, there is already a character in data register 22.

Line 330 represents the LOAD signal on line 52 in FIG. 1 and indicates the instant a parallel word in data register 22 is transferred to serializer register 50 via bus 44. LOAD marks the start of each 1.8 millisecond character cycle. Line 335 represents the time during each cycle when feedback signal FB on line 64 from card write control 58 is active. Line 340 represents the pulses of STROBE signal on line 62 from card write control 58. STROBE is up seven times during a given cycle so that seven bits are shifted out from serializer register 50 onto data line 56 which goes to the card write control 58. Line 345 represents the STATUS signal on line 36 which comes up immediately after the transfer of parallel character data from data register 22 to serializer register 50, and goes down immediately when processor 10 reads the status. The STATUS signal on line 36 is on when data register 22 is ready to accept the next character from processor 10. Line 350 shows when processor 10 issues a read status RSTAT command through address decoder 24 on line 38 when it has the next seven bit character ready on bus 12. Processor 10 then, as shown on line 355, issues a load LDATA command via address decoder 24 on line 30 to data register 22 since it found the STATUS signal on. If processor 10 had not found STATUS on, it would have requested status again and again at short intervals (approximately 30 microseconds) until it did find STATUS on. Then the processor 10 would issue a load LDATA command. Once processor 10 has issued the LDATA command it begins immediately to prepare the next character for transfer.

Referring now to cycle C2, it is seen that RSTAT does not occur until very near the end of cycle. In effect, processor 10 has "borrowed" time by using more that the duration of one character output cycle to ready the next character for transfer. In cycles C3 and C4 processor 10 issues RSTAT commands after time intervals shorter than a character output time. "Borrowed" time is thus repaid in succeeding cycles.

It will be appreciated by those skilled in the art that the present invention provides a distinct advantage in allowing real time character processing and output at intervals which may be substantially less than maximum character processing time.

While the invention has been shown and described with reference to a preferred embodiment thereof, it will be understood by those skilled in the art that changes in form and details may be made therein without departing from the spirit and scope of the invention.

What is claimed is:

1. In a text processing system, interface apparatus for real time transfer of data between a processor preparing and presenting data at irregular intervals and an output device requiring data at regular intervals wherein the longest processor interval is less than two output intervals, said interface comprising in combination:

first buffer means for receiving data from said processor;

second buffer means for receiving data from said first buffer means and connected to said output device;

means for indicating to said processor when transfer of data from said second buffer has begun; and means responsive to said indicating means for allowing said processor to transfer new data to said first buffer means immediately subsequent to said beginning of transfer from said second buffer whereby said processor is free to initiate processing of a succeeding character.

2. The apparatus of claim 1 further including means for causing transfer of said data to said output means at the beginning of each output cycle provided there has been a transfer of a new data from said processor to said first buffer.

3. The apparatus of claim 2 further including means operative when no new character is in said first buffer at the beginning of an output cycle for causing transfer of a character to said output buffer immediately following the loading of a new character into said first buffer by said processor.

4. The interface apparatus of claim 1 wherein:

said buffer means receives data representing one character in parallel format from said processor; and said second buffer means receives data representing one character in parallel from said first buffer means and transfers said data in serial format to said output device.

5. In a word processing system, apparatus for interfacing between a processor which outputs characters in parallel format at a variable rate and a data utilization device requiring serial data at a constant rate, said apparatus including:

a first register for receiving one character at a time from said processor;

a serializer register for receiving a character from said register at the constant rate of the data utilization device and outputting serial bits to said data utilization device;

means indicating each time said serializer register receives a character from said first register,; said indicating means being interrogable by said processor when it has a character ready; and means for loading said first register when the processor has successfully interrogated said indicating means.

* * * * *